Butler & Hoadley,
Changing Speed.
Nº 35,729.        Patented June 24, 1862.
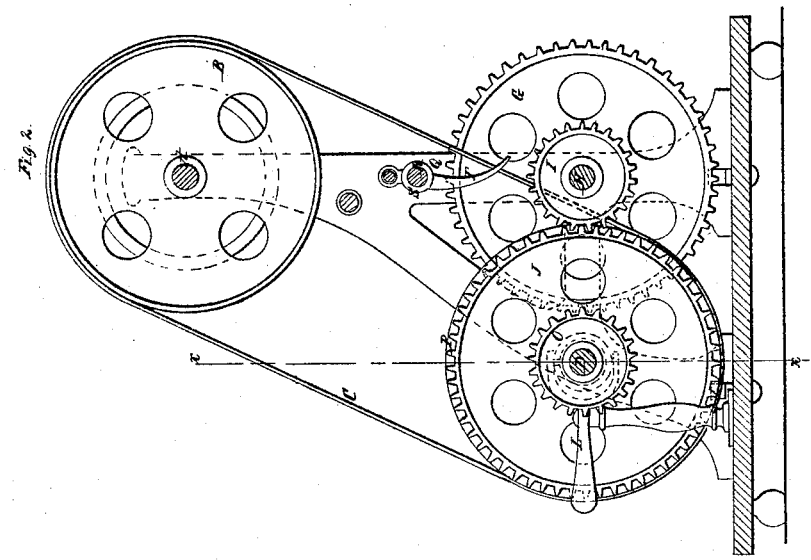
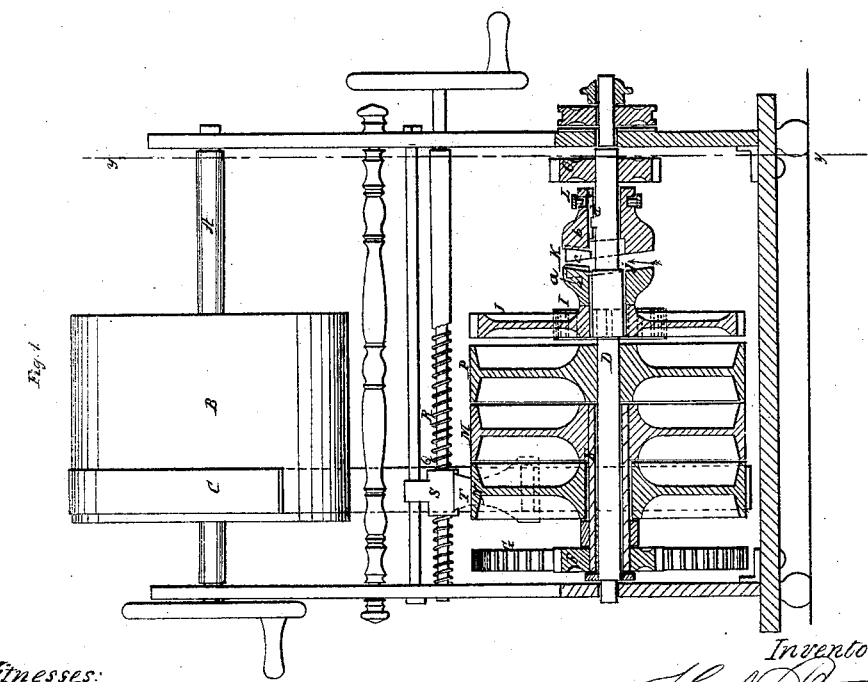
Witnesses:
Inventors:

UNITED STATES PATENT OFFICE.

H. V. BUTLER, OF NEW YORK, N. Y., AND J. C. HOADLEY, OF LAWRENCE, MASSACHUSETTS, ASSIGNORS TO SAID H. V. BUTLER.

IMPROVEMENT IN DEVICES FOR CHANGING SPEED IN MACHINERY.

Specification forming part of Letters Patent No. 35,729, dated June 24, 1862.

*To all whom it may concern:*

Be it known that we, H. V. BUTLER, of the city, county, and State of New York, and J. C. HOADLEY, of Lawrence, in the county of Essex and State of Massachusetts, have invented a new and useful Implement or Device for Changing Speed in Applying Power to Machinery, and without causing any cessation of movement; and we do hereby declare that the following is a full, clear, and exact description of the same, reference being had to the accompanying drawings, making a part of this specification, in which—

Figure 1 is a vertical section of our invention, taken in the line $xx$, Fig. 2; Fig. 2, a vertical section of the same, taken in the line $yy$, Fig. 1.

Similar letters of reference indicate corresponding parts in the two figures.

The object of this invention is to obtain a device by which the speed of machinery may be changed at will and very expeditiously without any cessation of movement.

The invention will be found a great acquisition applied to machinery which requires to have its speed changed during its operation from slow to fast in order to favor the manufacture of certain articles—as, for instance, machinery for manufacturing paper, printing calico, &c.

To enable those skilled in the art to fully understand and construct our invention, we will proceed to describe it.

A represents the driving-shaft, or the shaft from which the power is taken; and B is a drum on said shaft, around which the driving-belt C passes.

D is a shaft which is driven from shaft A, and has upon it a loose collar, E. This collar is fitted snugly on shaft D, but still is allowed to turn freely on it, or without any undue friction. On the outer part of the collar E there is placed and permanently attached a pinion, F, which gears into a toothed wheel, G, on a shaft, H, the latter having a pinion, I, upon it, which gears into a wheel, J, placed loosely on the shaft D, and having the part $a$ of a clutch, K, attached concentrically to it, the part $a$ of the clutch being also placed loosely on shaft D. The clutch K is formed of two parts, $a$ $b$, provided at their face sides with ratchet-shaped teeth or projections $c$, which engage with each other when the part $a$ is turned in the direction indicated by arrow 1. (See Fig. 1.) The part $b$ of the clutch is also fitted loosely on shaft D, so that it may slide longitudinally thereon; but it is connected to shaft D by a feather, $d$, and groove $e$, so that it may serve as means to rotate said shaft at certain times, as hereinafter described. The part $b$ of the clutch has a lever, L, connected to it for the purpose of shoving $b$ in gear with $a$ when necessary.

M is a pulley which is placed on the collar E and attached permanently thereto, and N is a pulley of the same diameter as M, but fitted loosely on the collar E. The pulley N is simply an idle-pulley.

O is a pinion or wheel which is placed on and permanently attached to the shaft D. Power is taken from D through the medium of the pinion or wheel O.

P is a pulley which is placed on and permanently attached to the shaft D. The pulleys M N P are of equal diameter, and the belt C may be made to work on any one of them by means of a belt-shipper, Q, formed of a screw, R, and nut S, with a guide, T, attached.

From the above description it will be seen that when the belt C is on the idle-pulley N the shaft D will be inoperative, as the pulley N turns loosely on the collar E, and that when the belt C is adjusted on pulley M the shaft D will be rotated through the medium of the gearing F G I J and the clutch K, the part $a$ of said clutch being engaged with the part $b$ and the latter communicating motion to shaft D, $b$ being thrown in gear with $a$ by means of lever L. When the belt C is cast from pulley M on pulley P, motion is communicated directly from shaft A to D, and the speed of the latter is increased, it being equal to that of A, provided the pulley P is equal in diameter to the drum B. When the shaft D is thus directly rotated from A, the part $b$ of the clutch K does not of course engage with $a$, as $b$ rotates faster than $a$, and the teeth $c$ cannot engage, owing to their form and relative position with each other. In effecting this change of speed there is no cessation of movement, the increased speed commencing at the termination of the slow speed. If, for instance, the belt C be moved from pulley M to pulley P, it will rotate shaft D through the medium of the gearing and clutch specified until the belt has a sufficient bearing on P to rotate it, at which moment the direct rotation of D from A commences. Pulley M may rotate until the belt C leaves it entirely, but without any effect, as the part *b* of the clutch K will move faster than the part *a*.

We do not claim, broadly, the invention or use of sliding belts and geared pulleys; but,

Having thus described our invention, what we claim as new, and desire to secure by Letters Patent, is—

The combination of the collar E, its attached pinion F, and the pulleys T M with the shaft D, pulley P, clutch K, gears G I J, and belt-shipper Q, in the manner and for the purpose herein shown and described.

H. V. BUTLER.
J. C. HOADLEY.

Witnesses:
JAMES LAIRD,
J. W. COOMBS.